United States Patent
Chaudhuri et al.

(10) Patent No.: US 10,523,482 B2
(45) Date of Patent: Dec. 31, 2019

(54) SYSTEM AND METHOD FOR PROVIDING IMPROVED NON-ORTHOGONAL MULTIPLE ACCESS IN A WIRELESS COMMUNICATION NETWORK

(71) Applicant: Wipro Limited, Bangalore (IN)

(72) Inventors: Saptarshi Chaudhuri, Bangalore (IN); Shyam Sundar Pal, Kolkata (IN)

(73) Assignee: Wipro Limited, Bangalore (IN)

( * ) Notice: Subject to any disclaimer, the term of this patent is extended or adjusted under 35 U.S.C. 154(b) by 72 days.

(21) Appl. No.: 15/410,008

(22) Filed: Jan. 19, 2017

(65) Prior Publication Data
US 2018/0145855 A1 May 24, 2018

(30) Foreign Application Priority Data
Nov. 23, 2016 (IN) .............................. 201641039946

(51) Int. Cl.
*H04L 27/26* (2006.01)
*H04W 8/00* (2009.01)
*H04W 72/04* (2009.01)

(52) U.S. Cl.
CPC ......... *H04L 27/2602* (2013.01); *H04W 8/005* (2013.01); *H04W 72/0473* (2013.01)

(58) Field of Classification Search
CPC .............. H04L 27/2602; H04W 8/005; H04W 72/0473; H04W 72/121; H04W 52/262; H04W 52/285
See application file for complete search history.

(56) References Cited

U.S. PATENT DOCUMENTS

| | | | | |
|---|---|---|---|---|
| 9,161,335 B2* | 10/2015 | Venkatraman | ....... | H04B 7/0452 |
| 9,438,324 B2* | 9/2016 | Ohm | ................. | H04B 7/0417 |
| 2008/0298482 A1* | 12/2008 | Rensburg | ............. | H04B 7/0639 |
| | | | | 375/260 |
| 2011/0158189 A1* | 6/2011 | Kuo | ...................... | H04B 7/024 |
| | | | | 370/329 |
| 2014/0254495 A1* | 9/2014 | Farmanbar | ............ | H04W 72/12 |
| | | | | 370/329 |
| 2016/0249198 A1* | 8/2016 | Kim | ...................... | H04W 48/16 |
| 2017/0245211 A1* | 8/2017 | Patil | ..................... | H04W 8/005 |
| 2017/0332389 A1* | 11/2017 | Sun | ..................... | H04W 72/121 |
| 2018/0063856 A1* | 3/2018 | Yang | .................... | H04W 72/12 |

* cited by examiner

*Primary Examiner* — Redentor Pasia
(74) *Attorney, Agent, or Firm* — Pepper Hamilton LLP

(57) ABSTRACT

This disclosure relates generally to communication network, and more particularly to a system and method for providing an improved Non-Orthogonal Multiple Access (NOMA) in a wireless communication network. In one embodiment, a method is provided for providing an improved NOMA in a wireless communication network. The method comprises dynamically creating a plurality of user equipment (UE) groups within a network coverage area based on at least one of a modulation coding scheme (MCS) for each UE, a received signal power at each UE, and a mobility of each UE, determining an appropriate codeword for each of the plurality of UE groups, and assigning the appropriate codeword to each of the plurality of UE groups. Each of the plurality of UE groups comprises a plurality of UE's.

21 Claims, 8 Drawing Sheets

SYSTEM AND METHOD FOR PROVIDING IMPROVED NON-ORTHOGONAL MULTIPLE ACCESS IN A WIRELESS COMMUNICATION NETWORK

This application claims the benefit of Indian Patent Application Serial No. 201641039946 filed Nov. 23, 2016 which is hereby incorporated by reference in its entirety.

TECHNICAL FIELD

This disclosure relates generally to communication network, and more particularly to a system and method for providing an improved Non-Orthogonal Multiple Access (NOMA) in a wireless communication network.

BACKGROUND

Mobile devices have become ubiquitous in today's world and are increasingly used to access various communication services (e.g., voice calls, video calls, messaging, streaming multimedia content, playing high definition online games, and so forth) over wireless communication networks. A wireless communications network may include a number of base stations (BS's), each supporting communication for a number of mobile devices or user equipment (UE's). A UE may communicate with a BS via downlink and uplink. The downlink (or forward link) refers to the communication link from the BS to the UE, and the uplink (or reverse link) refers to the communication link from the UE to the BS. Further, the wireless communication networks may correspond to multiple-access networks capable of supporting multiple users (i.e., UE's) by sharing the available network resources (e.g., time, frequency, and power).

Conventional third generation (3G) and fourth generation (4G) wireless communication networks employ various orthogonal multiple access (OMA) as multiple access techniques, such as code division multiple access (CDMA) in 3G, and frequency division multiple access (FDMA) or time division multiple access (TDMA) in 4G. OMA techniques involve transmitting to multiple UE's with full power. The transmission is based on splitting resources such as frequency in FDMA, the code in CDMA, or time in TDMA. Such a division is intended to increase the number of UE's that can be catered to by the BS's. However, the ability of OMA technologies to meet exponentially increasing demand for mobile data is limited and the existing wireless communications networks are increasingly getting congested. Advance wireless communication networks (advance 4G or 5G) employing multiple access techniques, such as non-orthogonal multiple access (NOMA) have the potential of meeting the demand of increasing UE's and the quality of service (QoS) requirements, which are outstripping the ability of the aforementioned OMA technologies.

NOMA is a multiple access technique for encoding signals in wireless communication that enables several users to use the same frequency bandwidth that is differentiated by the power allocated for each user. NOMA includes generation of codewords from a multi-dimensional codebook by using sparse code multiple access. NOMA further includes a combination of mapping quadrature amplitude modulation (QAM) symbol and spreading, wherein incoming bits are directly mapped to multi-dimensional codewords of codebook and spread over multiple sub-carriers. The same codeword may be applied or assigned to different UE's. Each UE corresponds to each layer, which stores codeword from one codebook. Thus, NOMA provides the mechanism for multiplexing different layers (i.e., signal for different UE's) during transmission of signals by the BS. The decoding technique in case of NOMA employs use of successive interference cancellation (SIC) to detect the signals of users with lower powers. As will be appreciated, codeword is data encoded using an error correcting code such as using a cyclic redundancy code (CRC). Further, as will be appreciate, a codebook is generated by partitioning multiple codewords and assigning indices to the codewords. The codebook correlates the codewords in complex vector space. Compared to the existing technologies, NOMA provides higher network capacity (up to 1000 times current network capacity), better connectivity (up to 100 times current number of device used), higher data rate (up to 100 times current packet data rate), reduced network latency (less than 1 ms) at lower cost, higher energy efficiency, and enhanced robustness.

However, existing techniques for providing NOMA has a number of limitations. For example, existing techniques provide for assignment of distinct codewords from codebook to each UE in the coverage area under NOMA. However, the limited number of codewords may get exhausted in case of number of UE's in the coverage area and those seeking admission into the coverage area exceeds the available number of codewords. Further, such scenarios may result in undesired admission refusal of the UE's. In other words, existing techniques are limited in supporting large number of UE's because of the distinct codeword assignment to each UE that may impact the service allowance of UE's. Additionally, existing techniques fail to provide mechanism for appropriate codeword assignment for supporting multiple MCS simultaneously under NOMA. The BS uses a mechanism for multiplexing signals for each UE with distinct codeword for signal transmission for a specific MCS. However, this may impact multiplexing of transmitted signals for multiple MCS simultaneously and may further aggravate inter cell interference. Further, existing techniques fail to provide mechanism for interference avoidance or mitigation among transmitted signals for UE with similar assigned-codeword or pattern within close proximity. This may increase SINR impacting quality of signal reception by UE's. In other words, codeword assignment is NOMA based without supporting use of multiple MCS simultaneously and without considering interference avoidance among neighboring UE's. Moreover, existing techniques provide for signal power allocation based on dynamically determined relative channel quality of individual UE's or UE-clusters, thereby requiring frequent change in such determination due to UE-mobility. This may lead to inappropriate allocation of signal power to UE's and/or UE-cluster. The issue gets further aggravated with increased number of UE's in the coverage area and with extent of mobility of the UE's in the coverage area.

SUMMARY

In one embodiment, a method for providing an improved Non-Orthogonal Multiple Access (NOMA) in a wireless communication network is disclosed. In one example, the method comprises dynamically creating a plurality of user equipment (UE) groups within a network coverage area based on at least one of a modulation coding scheme (MCS) for each UE, a received signal power at each UE, and a mobility of each UE. Each of the plurality of UE groups comprises a plurality of UE's. The method further comprises determining an appropriate codeword for each of the plurality of UE groups. The method further comprises assigning the appropriate codeword to each of the plurality of UE groups.

In one embodiment, a system for providing an improved NOMA in a wireless communication network is disclosed. In one example, the system comprises at least one processor and a memory communicatively coupled to the at least one processor. The memory stores processor-executable instructions, which, on execution, cause the processor to dynamically create a plurality of user equipment (UE) groups within a network coverage area based on at least one of a modulation coding scheme (MCS) for each UE, a received signal power at each UE, and a mobility of each UE. Each of the plurality of UE groups comprises a plurality of UE's. The processor-executable instructions, on execution, further cause the processor to determine an appropriate codeword for each of the plurality of UE groups. The processor-executable instructions, on execution, further cause the processor to assign the appropriate codeword to each of the plurality of UE groups.

In one embodiment, a non-transitory computer-readable medium storing computer-executable instructions for providing an improved NOMA in a wireless communication network is disclosed. In one example, the stored instructions, when executed by a processor, cause the processor to perform operations comprising dynamically creating a plurality of user equipment (UE) groups within a network coverage area based on at least one of a modulation coding scheme (MCS) for each UE, a received signal power at each UE, and a mobility of each UE. Each of the plurality of UE groups comprises a plurality of UE's. The operations further comprise determining an appropriate codeword for each of the plurality of UE groups. The operations further comprise assigning the appropriate codeword to each of the plurality of UE groups.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Figure 1:
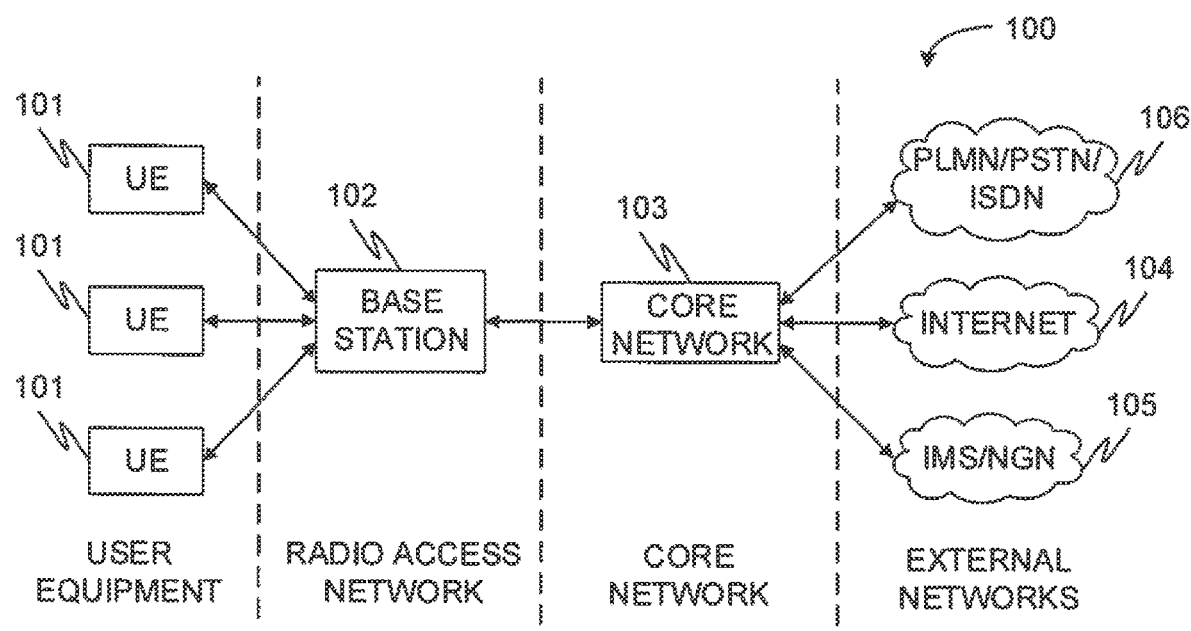
FIG. 1 illustrates an exemplary communication network architecture in which various embodiments of the present disclosure may function.

Referring now to FIG. 1, an exemplary communication network architecture in which various embodiments of the present disclosure may function is illustrated. The communication network 100 may include one or more user equipment (UE's) 101 communicating wirelessly with various radio access networks. Examples of a UE 101 may include, but are not limited to, a cell phone, a smart phone, a tablet, a phablet, and a laptop. For purpose of illustration, the various radio access networks include, but are not limited to, a GSM EDGE radio access network (GERAN), a UMTS terrestrial radio access network (UTRAN), an evolved UMTS terrestrial radio access network (E-UTRAN), an improved E-UTRAN, and a new radio access networks. Each of the radio access networks include a number of base stations (BS) 102, each supporting communication for a number of UE's 101 in its coverage area. It should be noted that the coverage area of a BS 102 may be divided into sectors that constitute only a portion of the total coverage area of all the base stations combined. Further, it should be noted that there may be overlapping coverage areas for different radio access networks employing different technologies. A base transceiver station (BTS) and a base station controller (BSC) form the BS 102 for GERAN while a Node B and a radio network controller (RNC) form the BS 102 for UTRAN. Similarly, evolved Node B (eNodeB or eNB) acts as the BS 102 for E-UTRAN i.e., long term evolution (LTE) network, while an improved eNB may act as the BS 102 for improved E-UTRAN i.e., advance LTE. The depicted radio access networks are merely exemplary, and thus it will be understood that the teachings of the disclosure contemplate other existing wireless radio access networks (e.g., worldwide interoperability for microwave access (WiMAX) network, High Speed Packet Access (3GPP's HSPA) network, and so forth) or any new wireless radio access networks that may employ or facilitate non-orthogonal multiple access (NOMA) as multiple access technique, in accordance with embodiments of the present disclosure.

Each of the radio access networks may be communicatively coupled with a respective core network, which in turn may communicate with external networks (packet switched networks or circuit switched networks). The core network 103 may include a packet core which in turn may be communicatively coupled with external packet switched networks (e.g., Internet 104, IP multimedia subsystem (IMS) network 105, or a next generation network (NGN) 105, etc.) or a circuit switched core network which in turn may communicate with external circuit switched networks (e.g., public land mobile network (PLMN) 106, public switched telephone network (PSTN) 106, integrated service digital network (ISDN) 106 etc.).

For example, the GERAN and the UTRAN communicate with a circuit switched core network comprising mobile services switching center (MSC), gateway MSC (GMSC), home location register or visitor location register (HLR/VLR). The MSC and GMSC serve the UE 101 in its current location for circuit switched services and are responsible for the interworking with external circuit switched networks. In some embodiments, the MSC and GMSC also interwork with external packet switched networks, such as IP multimedia subsystem (IMS) network. For example, the MSC may connect to a media gateway (MGW) of the IMS network. The HLR/VLR is a mobile operator database accessible by MSC and which includes information with respect to users such as phone number, location within home/visiting network, and so forth. Further, the GERAN and the UTRAN also communicate with a packet core that includes serving GPRS support node (SGSN) and gateway GPRS support node (GGSN). As will be appreciated by those skilled in the art, a general packet radio service (GPRS) is a packet-oriented mobile data service that enables 2G and 3G cellular networks to transmit IP packets to external networks such as the Internet. The SGSN is a component of the GPRS network that handles functions related to packet switched data within the network such as packet routing and transfer, mobility management, charging data, authentication of the users, and so forth. Similarly, GGSN is another component of the GPRS network and is responsible for the interworking between the GPRS network and external packet switched networks, such as Internet or IMS network.

Similarly, E-UTRAN communicates with an evolved packet core (EPC) that includes a mobility management entity (MME), a serving gateway (SGW), a packet data network gateway (PGW), a policy control and charging rules function (PCRF), and a Home Subscriber Server (HSS). The MME may be responsible for evolved packet system (EPS) session management (ESM), EPS mobility management (EMM), EPS connection management (ECM), non-access stratum, ciphering and integrity protection, inter core network signaling, system architecture evolution (SAE) bearer control, handover, and so forth. The combined functionalities of the SGW and the PGW may include lawful interception (LI), packet routing and forwarding, transport level packet marking in the uplink and the downlink, accounting on user, packet filtering, mobile IP, policy enforcement, and so forth. The PGW further connects the EPC with external packet switched networks such as the Internet or NGN. The PCRF is responsible for policy enforcement decisions as well as for charging functionalities. The HSS is a master user database containing user subscription related information such as user identification, user profile, and so forth. The HSS performs authentication and authorization of the user, and so forth.

The NGN 105 or IMS network 105 may include a node (e.g., media gateway controller (MGC) in case of the NGN, or a serving-call session control function (S-CSCF) in case of the IMS networks) that anchors the session and is responsible for session management, routing and control. Additionally, the node may be responsible for control and management of media servers. The NGN 105 or IMS network 105 may further include a media gateway (MGW) that enables multimedia communications across packet-switched and circuit-switched networks by performing conversions between different transmissions and coding techniques. In some embodiments, the NGN 105 or IMS network 105 may also include a signalling gateway that may be used for performing interworking between signalling protocols such as signalling system 7 (SS7) when connecting to PSTN/PLMN networks 106 and IP-based signalling protocols such as SIGTRAN which is supported by the node. It should be noted that, in some embodiments, the NGN 105 or IMS network 105 may also access and use the HSS.

The description below describes an LTE network for purposes of example, and LTE terminology is used in much of the description below. However, as stated above the techniques are applicable beyond LTE networks. Thus, the following description provides examples, and is not limiting of the scope, applicability, or configuration set forth in the claims. Changes may be made in the function and arrangement of elements discussed without departing from the spirit and scope of the disclosure. Various embodiments may omit, substitute, or add various procedures or components as appropriate. For instance, the methods described may be performed in an order different from that described, and various steps may be added, omitted, or combined. Also, features described with respect to certain embodiments may be combined in other embodiments.

Figure 2:
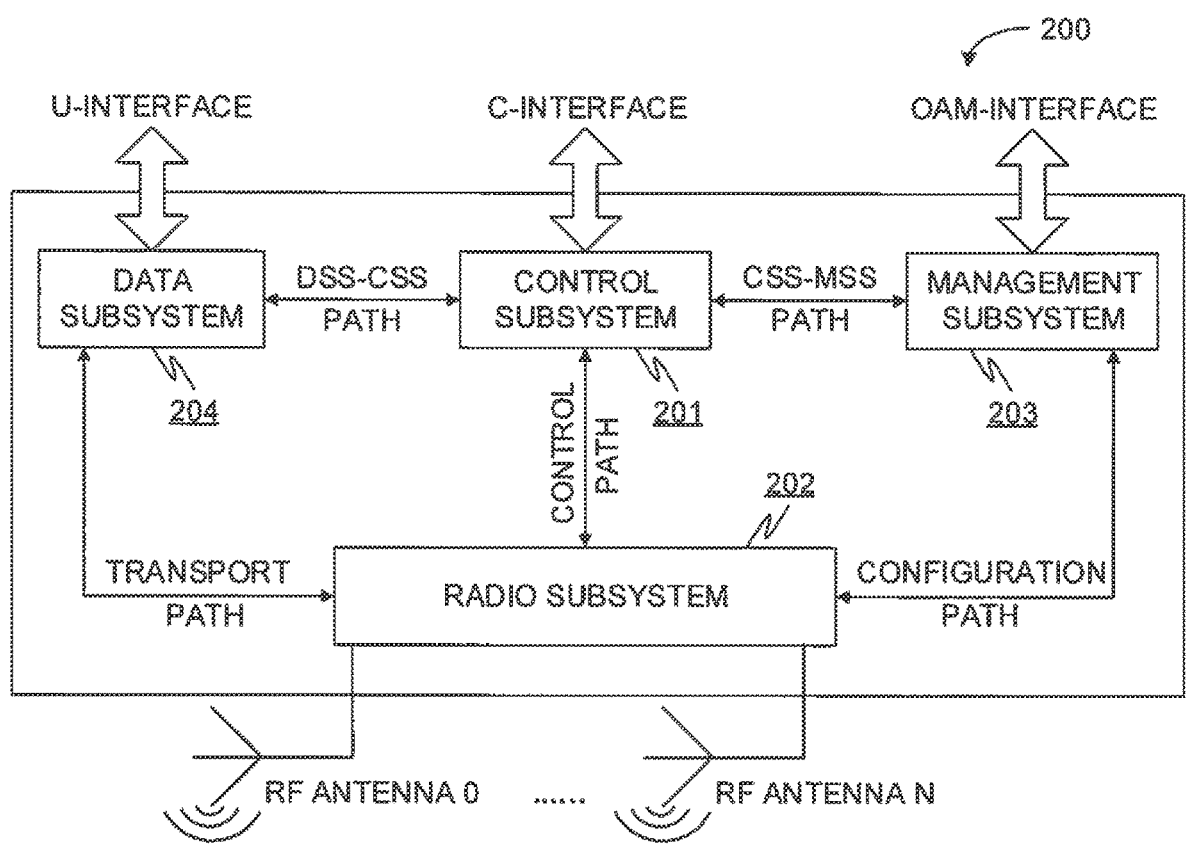
FIG. 2 is a functional block diagram of an exemplary evolved Node B (eNB) that may be employed as the base station (BS) in the communication network for providing an improved Non-Orthogonal Multiple Access (NOMA), in accordance with some embodiments of the present disclosure.

Referring now to FIG. 2, a functional block diagram of an exemplary evolved Node B (eNB) 200 that may be employed as the BS 102 in the communication network 100 of FIG. 1 for providing an improved NOMA is illustrated, in accordance with some embodiments of the present disclosure. As will be described in greater detail below, the eNB 200 may be responsible for radio resource management, header compression and encryption of user data stream, packet scheduling and transmission, broadcast information transfer, physical layer processing, and so forth. In some embodiments, the eNB 200 includes a control subsystem (CSS) 201, a radio subsystem (RSS) 202, a management subsystem (MSS) 203, and a data subsystem (DSS) 204.

The CSS 201 is responsible for carrying control messages for UE's and core network and will be described in greater detail in FIG. 3 below. The RSS 202 is responsible for radio communication with the UE's through various radio specific elements. As will be appreciated, the RSS 202 communicates with the UE's through a number of RF Antennas (RF Antenna 0 . . . RF Antenna N). The RSS 202 will be described in greater detail in FIG. 4 below. The MSS 203 is responsible for system level management of co-channel interference, radio resources, and other radio transmission characteristics in eNB, and will be described in greater detail in FIG. 5 below. The DSS 204 is responsible for carrying user traffic as well as control messages for UEs in conjunction with CSS 201.

Each of these subsystems 201-204 interacts with each other and with external components through a number of interfaces and data paths. For example, a bidirectional link, U-Interface, connecting the DSS 204 to the serving gateway (SGW) may carry the user plane data over the socket interface. A gateway tunneling protocol (GTP-U) may be employed for communication to exchange user data. It should be noted that the user space data may be data packets between multimedia servers or other users and user multimedia applications such as video, VoIP, gaming, etc. Similarly, a bidirectional link, C-interface, connecting the CSS 201 to MME may carry the control plane information over the socket interface. A S1 application protocol (S1-AP) may be employed for communication to exchange control data. It should be noted that the control space data may be data packets between packet core/eNB and users and may be responsible for radio connection establishment, mobility management, and session management (session establishment & termination). Additionally, a bidirectional link, OAM-interface, connecting the MSS 203 to operations administration and management (OAM) subsystem may carry the management or configuration information over the socket interface and may be employed to receive management or configuration information from OAM and to provide system level feedback to OAM. A TR-69 protocol may be employed for communication to exchange management or configuration data. It should be noted that the management or configuration data may be management or configuration information from OAM subsystem that may be required for configuration or instantiation of eNB.

Further, in an instance, a bidirectional path, transport path, connecting the DSS 204 with the RSS 202 may carry the user plane data as well as control plane data over the message queues depending on protocols employed (e.g., radio link control (RLC) protocol, packed data convergence protocol (PDCP), and medium access control (MAC) protocol). Similarly, a bidirectional path, control path, connecting the CSS 201 with the RSS 202 may carry control plane information over the message queues using radio resource control (RRC) protocol. It should be noted that, in some embodiments, transport path and control path may be interchangeably used depending on the different protocols employed and messages that they carry. Additionally, a bidirectional path, configuration path, connecting the MSS 203 with the RSS 202 may carry configuration information for the RSS 202 over the message queues. In some embodiments, a Femto API (FAPI) standard may be employed for communication in the above referenced paths. Further, a bidirectional path, DSS-CSS path, connecting the DSS 204 with the CSS 201 may be employed to send and receive control and configuration messages from CSS 201. Similarly, a bidirectional path, CSS-MSS path, connecting the MSS 203 with the CSS 201 may be employed for sending control instruction and configuration parameters to CSS 201 and receiving the system level measurement data from CSS 201.

As will be appreciated, during first-time start-up, the eNB 200 performs startup initialization by taking latest inputs of configuration parameters (e.g. from management application that may be a part of the MSS 203) and storing a copy of the received configuration parameters in a local memory of the CSS 201. During subsequent start-ups, the eNB 200 performs reconfiguration of parameters. The eNB 200 checks if there has been any change in eNB configuration parameters. For example, the eNB 200 checks if there is any new configuration parameter by checking the existing parameters. The eNB 200 also checks if any configuration parameter is modified by checking the parameter value. If there is no change in configuration parameters, the eNB 200 loads configuration parameters from the local memory of CSS 201 for performing configuration. However, if there are changes in the configuration parameters, the CSS 201 receives configuration information of eNB from remote storage of the management application through the MSS-CSS communication path. The CSS 201 then takes modified configuration parameters from the management application and configures modified parameters in the eNB 200 and stores a copy of updated configuration parameters in the aforementioned local memory of the CSS 201.

Figure 3:
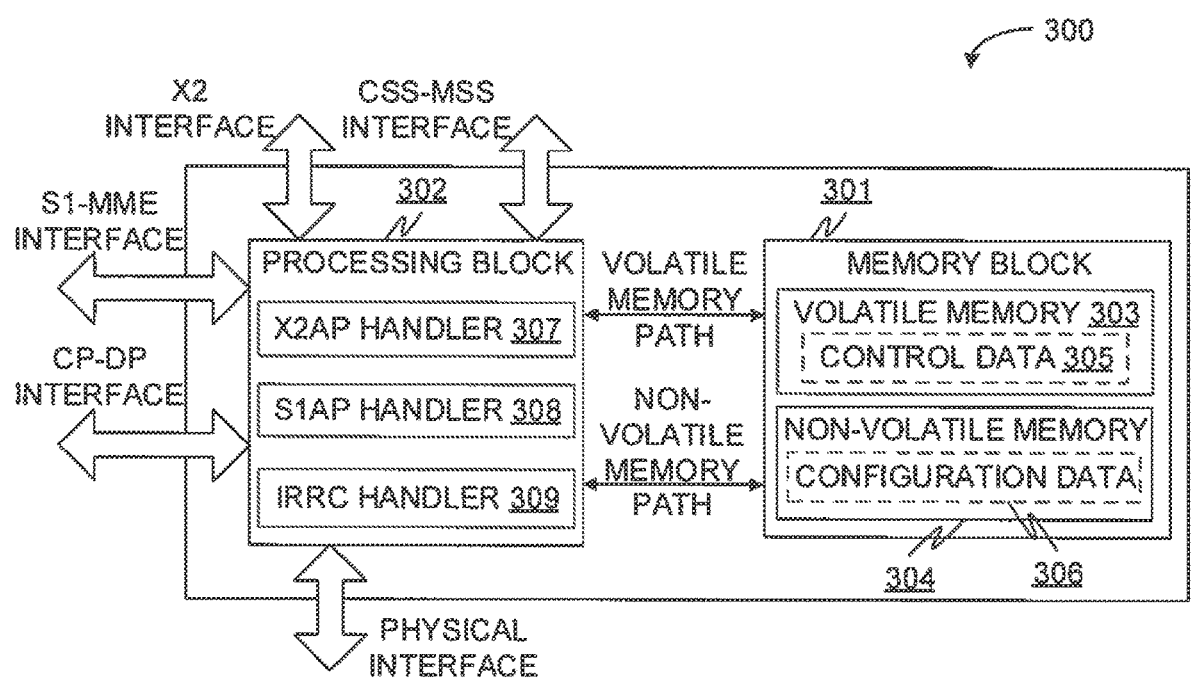
FIG. 3 is a functional block diagram of an exemplary control subsystem that may be employed in the eNB, in accordance with some embodiments of the present disclosure.

Referring now to FIG. 3, a functional block diagram of an exemplary control subsystem (CSS) 300 is illustrated, in accordance with some embodiments of the present disclosure. The CSS 300 is analogous to the CSS 201 implemented by the eNB 200 of FIG. 2. The CSS 300 includes a memory block 301 and a processing block 302. The memory block 301 includes a volatile memory 303 and a non-volatile memory 304. The volatile memory 303 in the CSS 300 stores the control data 305 (i.e., data for controlling the radio access and connection between network and UE). The processing block 302 uses volatile memory path to store and retrieve the control data 305 from the volatile memory 303. The non-volatile memory 304 in CSS 300 stores the configuration data 306 received from MSS 203 which in turn stores the configuration data received from OAM. As will be appreciated, the configuration data 306 from the MSS 203 may be employed to configure CSS 201 to make it operational. The processing block 302 uses non-volatile memory path to store and retrieve configuration data 306 from the non-volatile memory 304.

The processing block 302 may include a single processor with the multiple partitions or independent processors working in a group and configured to perform various functions. For example, the processing block 302 may include a X2AP handler 307 and a S1AP handler 308. The processing block may further include an improved radio resource controller (IRRC) handler 309 in accordance with aspects of the present disclosure. The S1AP handler 308 receives configuration data from MSS 203 through CSS-MSS interface. The S1AP handler 308 then processes the configured data and stores it in the non-volatile memory 304. The S1AP handler 308 further receives control data from packet core (MME) through S1-MME interface in downlink (DL) and from the IRRC handler 309 in uplink (UL). On receiving the data, the S1AP handler 308 processes the data (as per 3GPP TS 36.413 specification) and performs services and functions that include, but are not limited to, E-RAB configuration, allocation to/release from user-service-context, initial context set-up transfer function, determination of UE capability information, mobility functions, S1 interface establishment and release, NAS signaling transport function, S1 UE context management, and so forth. After processing the received control data packets and performing the desired execution, the S1AP handler 308 encodes the control data packets and sends the same to the IRRC handler 309 in DL and to the packet core (MME) through S1-MME interface in UL. A CP-DP interface may be employed to send and receive control and configuration messages to and from the DSS 204 via the CSS-DSS path.

The X2AP handler 307 receives configuration data from MSS 203 through CSS-MSS interface. The X2AP handler 307 then processes the configured data and stores it in the non-volatile memory 304. The X2AP handler 307 further receives control data packets from IRRC handler 309 in the UL and the DL. The X2AP handler 307 also receives control data packets through X2 interface from neighboring eNB's. On receiving the control data packets, the X2AP handler 307 processes the data (as per 3GPP TS 36.423 specification) and performs the services and functions that include, but are not limited to, handover processing, BS load processing, X2 interface establishment, eNB Configuration, and so forth. After processing the received control data packets and performing the desired execution, the X2AP handler 307 encodes the control data packets and sends the same to IRRC handler 309 and to neighboring eNB through X2 interface.

The IRRC handler 309 receives configuration data from MSS 203 via the CSS-MSS interface, configures itself based on the configuration data, and sends different configuration parameters to the UE's through PHY interface in DL and to the core network in UL. It should be noted that the PHY interface consists of transport channels in eNB and performs exchange of messages between the RSS and the CSS. The IRRC handler 309 receives UL control data packets from RLC handler (not shown) and PDCP handler (not shown) and DL control data packets from S1AP handler 308. On receiving the control data packets, the IRRC handler 309 processes the data (as per 3GPP TS 36.331 specification) and performs services and functions that include, but are not limited to, system information broadcast for NAS and AS, paging notification, establishment, maintenance and release of an RRC connection between the UE and E-UTRAN, security handling, establishment, configuration, maintenance and release of point to point radio bearers, mobility decision processing, QoS management functions, UE measurement configuration and report handling, NAS message transfer between UE and core network, outer loop power control, and so forth. After processing the received control data packets and performing the desired execution, the IRRC handler 309 encodes the data packets and sends the same to UE handler in DL, to S1AP/X2AP handler through S1-MME interface in UL, and to neighboring eNB through X2 interface.

The IRRC handler 309 has connection component for handling the connection establishment with the access network and core network. Additionally, the IRRC handler 309 has configuration component for receiving different configuration parameters (e.g. radio configuration for ARQ (Automatic Repeat Request), measurement configuration from MSS, etc.) so as to handle the configuration parameters for NOMA configuration. Further, the IRRC handler 309 has NOMA component for handling NOMA functionality in accordance with aspects of the present disclosure. The NOMA component is responsible for providing an improved NOMA by appropriate codeword assignment and power allocation for different MCS used by UE's as well as by for providing assistance to the latched UE's for NOMA. It should be noted that the NOMA component would work with other components of control subsystem and management subsystem for assisting UE in NOMA services. For initial configuration, the NOMA component sends message through configuration API for obtaining NOMA related configuration information. The NOMA component then keeps a local copy of all the configuration related parameters (in persistent memory of IRRC). In an embodiment, the NOMA related configuration information may have the parameters that include, but are not limited to, UE Group Timer (Timer$_{UEGroup}$) and Threshold Reference Signal Received Power (RSRP) (RSRP$_{th}$). The UE Group Timer (Timer$_{UEGroup}$) may be employed to determine the duration of timer for creating or altering the UE Group. Thus, after the expiry of Timer$_{UEGroup}$, the UE group may be formed or modified. Alternatively, the UE group may be formed or modified based on the exit and entry of UE in the network coverage area. The threshold RSRP (RSRP$_{th}$) may be employed to determine the deviation from calculated signal power and received signal power by a UE. If RSRP in the measurement report is below threshold level then NOMA component of IRRC corrects the calculated signal power.

Figure 4:
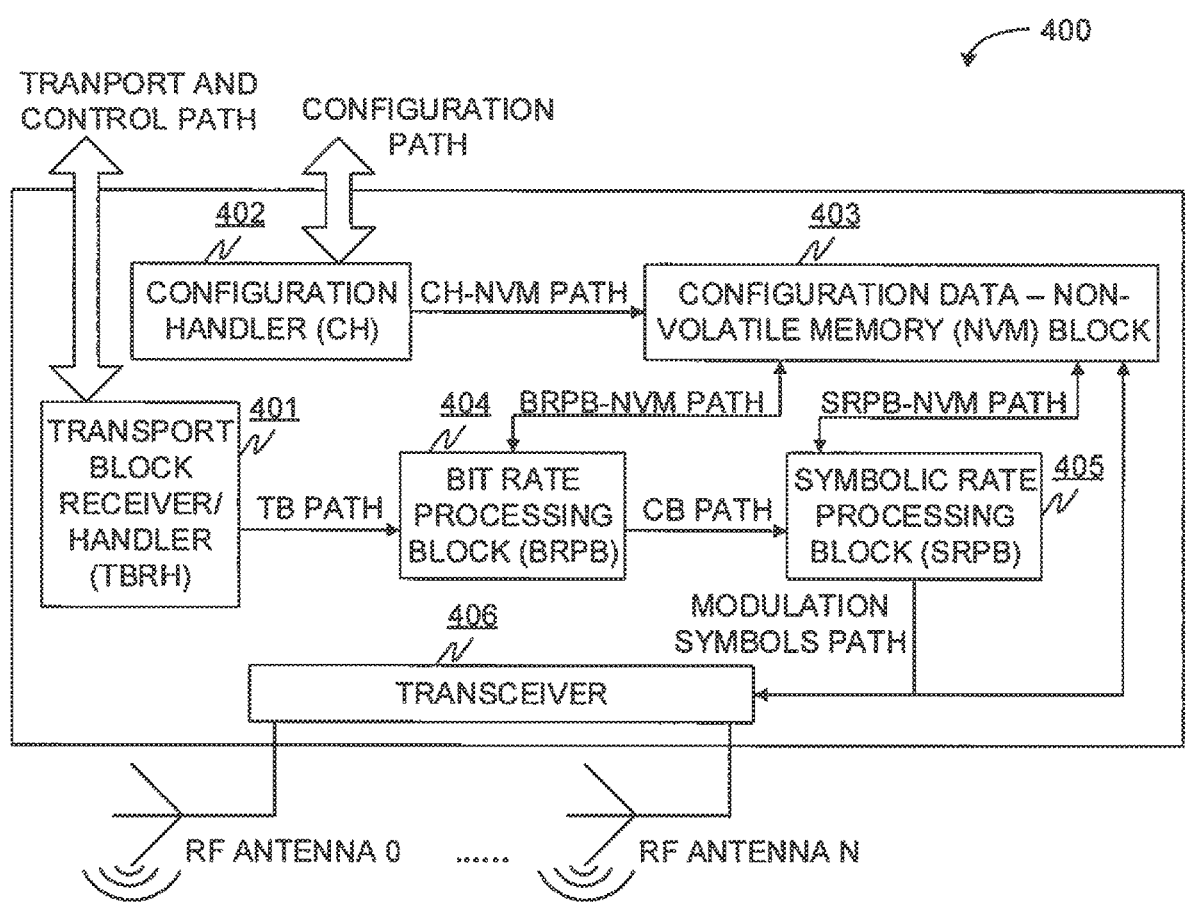
FIG. 4 is a functional block diagram of an exemplary radio subsystem that may be employed in the eNB, in accordance with some embodiments of the present disclosure.

Referring now to FIG. 4, a functional block diagram of an exemplary radio subsystem (RSS) 400 is illustrated, in accordance with some embodiments of the present disclosure. The RSS 400 is analogous to the RSS 202 implemented by the eNB 200 of FIG. 2. The RSS 400 includes a PHY handler (not shown), a transport block receiver or handler (TBRH) 401, a configuration handler (CH) 402, a configuration data non-volatile memory (NVM) block 403, a bit rate processing block (BRPB) 404, a symbol rate processing block (SRPB) 405, and a transceiver 406.

The PHY handler enables exchange of air interface messages between UE's and eNB using PHY protocol. Additionally, the PHY handler interfaces with DSS 204 and CSS 201 and offers data transport services to higher layers. The PHY handler may be responsible for channel coding, PHY hybrid automatic repeat request (HARD) processing, modulation, multi-antenna processing, mapping of the signal to the appropriate physical time-frequency resources, and so forth.

The TBRH 401 receives user data and control streams from the DSS in the form of transport blocks in a communication message over a transport/control path. The TBRH 401 then classifies the data as critical and non-critical data and forwards it to BRPB 404 over the TB path. The TB path is a uni-directional link connecting the TBRH 401 to the BRPB 404 and carries the transport block over the message queue interface.

The CH 402 receives configuration messages from the MSS in a communication message over a configuration path. The CH 402 then classifies and stores the configuration information in the configuration data NVM block 403. The CH 402 uses a unidirectional CH-Non-Volatile memory path to write the configuration parameters to the configuration data NVM block 403. The configuration data is stored in the non-volatile memory in the form of structures which is accessible to rest of the RSS 400 modules.

The BRPB 404 receives the transport blocks from the TBRH 401 in a communication message. The BRPB 404 then processes the received transport blocks as per the 3GPP TS 36.212 standard. For example, the BRBP 404 calculates the cyclic redundancy check (CRC) and attaches the same to the transport block. If the transport block size is larger than the maximum allowable code block size, such as a block size of 6,144 bits, a code block segmentation may be performed. Consequently, a new CRC may be calculated and attached to each code block before channel encoding (turbo encoding) provides a high-performance forward-error-correction scheme for reliable transmission. The BRBP 404 further performs rate matching (i.e., puncturing or repetition to match the rate of the available physical channel resource), and HARQ so as to provide a robust retransmission scheme when the user fails to receive the correct data. Additionally, bit scrambling may be performed after code-block concatenation to reduce the length of strings of 0's or 1's in a transmitted signal to avoid synchronization issues at the receiver before modulation. The code blocks may be forwarded to symbol rate processor over the CB path. The CB path corresponds to a uni-directional link connecting the BRPB 404 to the SRPB 405 and carries the code words over the message queue interface. A BRPB-Non-Volatile memory path may be employed to connect the BRPB 404 with the non-volatile memory where the configuration data may be stored.

The SRPB 405 receives code blocks in a communication message from BRPB 404 over the CB path. The SRPB 405 then processes the received code blocks as per the 3GPP TS 36.212 standard. The SRPB 405 processes the code blocks by converting them to modulation symbols. It should be noted that various modulation schemes (quadrature phase shift keying (QPSK), 16-quadrature amplitude modulation (16-QAM), or 64-QAM) may be employed. The modulation symbols may then be mapped to layers and precoding supports for multi-antenna transmission. The modulation symbols may be forwarded over a uni-directional high speed modulation symbols path to the transceiver 406 for transmission. A SRPB-Non-Volatile memory path may be employed to connect the SRPB 405 with the non-volatile memory where the configuration data may be stored.

The transceiver 406 receives modulation symbols over the modulation symbols path. The transceiver 406 then processes the received code blocks as per the 3GPP TS 36.212 standard. For example, the transceiver maps the modulation symbols to resource elements for providing NOMA. The resource elements may then be mapped to each antenna port and sent for air transmission through a number of RF Antennas (RF Antenna 0 . . . RF Antenna N).

Figure 5:
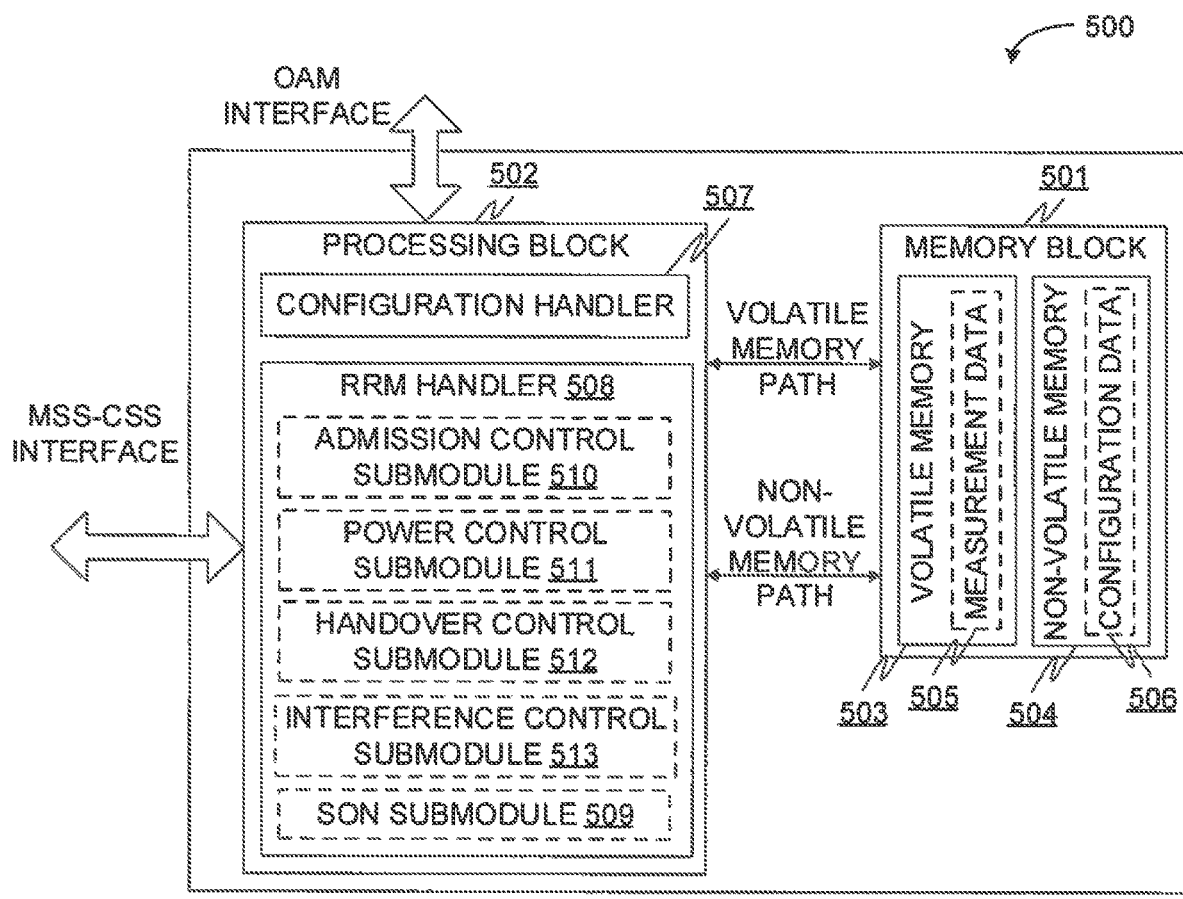
FIG. 5 is a functional block diagram of an exemplary management subsystem that may be employed in the eNB, in accordance with some embodiments of the present disclosure.

Referring now to FIG. 5, a functional block diagram of an exemplary management subsystem (MSS) 500 is illustrated, in accordance with some embodiments of the present disclosure. The MSS 500 is analogous to the MSS 203 implemented by the eNB 200 of FIG. 2. The MSS 500 includes a memory block 501 and a processing block 502. The memory block 501 includes a volatile memory 503 and a non-volatile memory 504. The volatile memory 503 in the MSS 500 stores the system level measurement data 505 provided by the CSS. The measurement data 505 represents the different measurement metrics collected from UE and calculated by CSS, DSS and RSS. These data 505 may be used to monitor the prevalent radio network condition so as to take appropriate radio network management decisions. Further, these data 505 may be used to take decision by a radio resource management (RRM) handler as discussed below. The processing block 502 uses volatile memory path to store and retrieve the measurement data 505 from the volatile memory 503. The non-volatile memory 504 in MSS 500 stores the configuration data 506 received from OAM. These data 506 represents the configuration information from OAM subsystem towards eNB required for configuration, updating existing configuration, instantiation of eNB's. The processing block 502 accesses the configuration data and configures the CSS, the DSS, and the RSS through MSS-CSS Interface. It should be noted that a portion of the non-volatile memory can persist across system-start-up cycles. The processing block 502 uses non-volatile memory path to store and retrieve configuration data 506 from the non-volatile memory 504.

The processing block 502 may include a single processor with the multiple partitions or independent processors working in a group and configured to perform various functions. For example, the processing block 502 may include a configuration handler 507 and a RRM handler 508. The configuration handler 507 handles the overall configuration of the whole eNB. The configuration handler 507 performs the services and functions, that include, but are not limited to, reception of configuration parameters from OAM and storage of configuration parameters at non-volatile memory during start up, interfacing with the CSS, the DSS, and the RSS, configuration of the CSS, the DSS, and the RSS with the configuration parameters stored at non-volatile Memory, reception of reconfiguration parameters from OAM, reconfiguration of the CSS, the DSS and the RSS, providing feedback to OAM to help OAM change in any configuration parameter, and so forth.

The RRM handler 508 takes management decision to efficiently run the eNB and includes a self-organizing network (SON) submodule 509, an admission control submodule 510, a power control submodule 511, a handover control submodule 512, and an interference control submodule 513. The SON submodule 509 performs various functions to (re)organize the eNB in a dynamically changing network topology. These functions include, but are not limited to, physical cell identity (PCI) self-configuration and self-optimization, automatic neighbor relation (ANR) management and X2 link auto creation, cell outage detection, cell coverage optimization, collecting live measurement metrics to provide feedback to the OAM subsystem about current condition of the network, and so forth. It should be noted that any decision is taken based on configuration data and measurement data stored in MSS. The admission control submodule 510 analyzes the current network load and the user capability so as to allow the user connectivity into the network. The power control submodule 511 analyzes different network condition to decide on the transmission power that has to be used by the eNB. The handover control submodule 512 analyzes the measurement data for different neighbor eNB to decide on the target eNB for the handover purpose. The interference control submodule 513 analyzes the measurement data for different neighboring eNB and reconfigures the eNB to reduce interference from other eNB's.

It should be noted that, apart from the CSS 300 and MSS 500, some of the other modules, subsystems, or network elements may have to be modified so as to implement and/or provide improved NOMA in the communication network. For example, network elements responsible for providing configuration parameters (e.g., OAM in MIME) or modules responsible for transmission of modulation symbols (e.g., transceiver in RSS) may be accordingly modified within the aspects of the present disclosure.

Further, it should be noted that the above discussed subsystems (CSS 300, RSS 400, MSS 500, etc.) and their modules may be implemented in programmable hardware devices such as programmable gate arrays, programmable array logic, programmable logic devices, and so forth. Alternatively, the subsystems and modules may be implemented in software for execution by various types of processors. An identified engine of executable code may, for instance, include one or more physical or logical blocks of computer instructions which may, for instance, be organized as an object, procedure, function, module, or other construct. Nevertheless, the executables of an identified engine need not be physically located together, but may include disparate instructions stored in different locations which, when joined logically together, include the engine and achieve the stated purpose of the engine. Indeed, an engine of executable code may be a single instruction, or many instructions, and may even be distributed over several different code segments, among different applications, and across several memory devices.

As will be appreciated by one skilled in the art, a variety of processes may be employed for providing an improved NOMA in a wireless communication network. For example, the exemplary communication network 100 and the associated base station (such as eNB 200) may facilitate implementation of improved NOMA by the processes discussed herein. In particular, as will be appreciated by those of ordinary skill in the art, control logic and/or automated routines for performing the techniques and steps described herein may be implemented by components of the communication network 100 (e.g., the base station 102), either by hardware, software, or combinations of hardware and software. For example, a suitable code may be accessed and executed by the one or more processors on the BS 102 to perform some or all of the techniques described herein. Similarly, application specific integrated circuits (ASICs) configured to perform some or all of the processes described herein may be included in the one or more processors on the BS 102. Additionally, it should be noted that though the process described below focuses on eNB, the process may also be equally applicable to other base station and will follow substantially similar principles with appropriate modifications in the control and management subsystems as well as any other associated subsystems.

Figure 6:
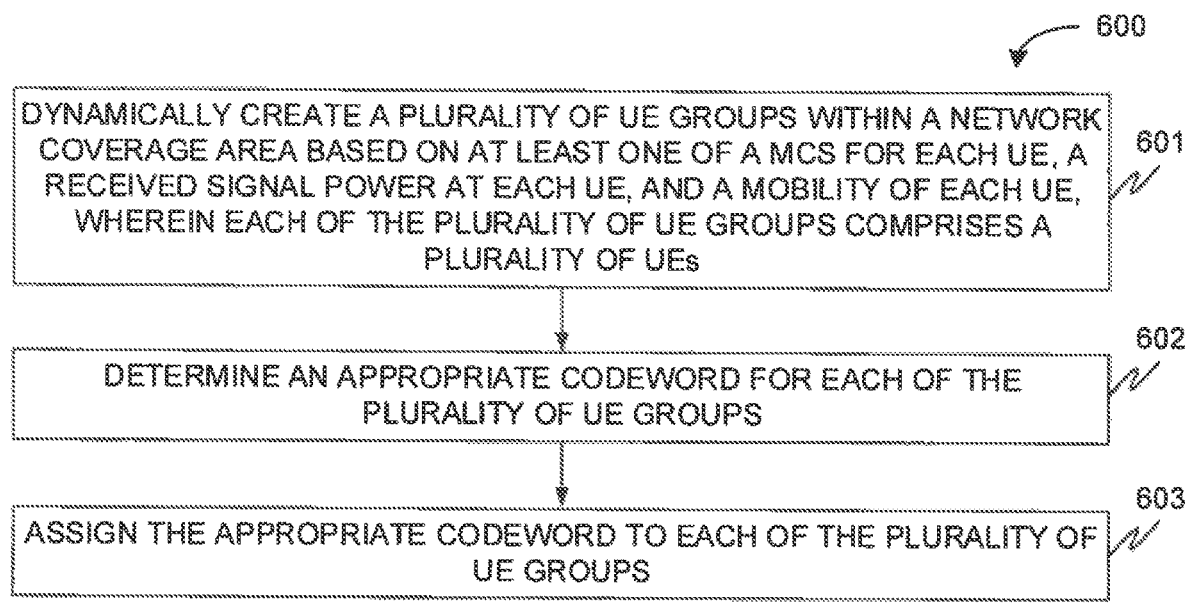
FIG. 6 is a flow diagram of an exemplary process for providing an improved NOMA in a communication network, in accordance with some embodiments of the present disclosure.

For example, referring now to FIG. 6, exemplary control logic 600 for providing improved NOMA in a communication network 100 via a system, such as the BS 102 (e.g., eNB 200), is depicted via a flowchart, in accordance with some embodiments of the present disclosure. As illustrated in the flowchart, the control logic 600 includes the steps of dynamically creating a plurality of user equipment (UE) groups within a network coverage area of a base station (BS) based on at least one of a modulation coding scheme (MCS) for each UE, a received signal power at each UE, and a mobility of each UE at step 601, determining an appropriate codeword for each of the plurality of UE groups at step 602, and assigning the appropriate codeword to each of the plurality of UE groups at step 603. It should be noted that each of the plurality of UE groups includes a plurality of UE's.

In some embodiments, the control logic 600 further includes the step of initializing the BS with a plurality of configuration parameters. In some embodiments, the control logic 600 further includes the steps of determining a signal power for each of the plurality of UE groups based on the corresponding appropriate codeword, and allocating the signal power to each of the plurality of UE groups. In some embodiments, allocating includes transmitting the signal power to each UE within a UE group for each of the plurality of UE groups, and validating a signal power received at each UE based on a pre-configured threshold power. In some embodiments, validating includes determining a deviation of the signal power received at each UE from the signal power determined for corresponding UE group, and comparing the deviation against the pre-configured threshold power.

In some embodiments, the plurality of UE groups may be dynamically created at step 601 at a pre-configured periodic interval. Alternatively, in some embodiments, the plurality of UE groups may be dynamically created at step 601 upon admission of a new UE into the network coverage area or upon exit of an existing UE from the network coverage area. In some embodiments, dynamically creating at step 601 includes determining a validity of each of the plurality of UE groups based on a change in at least one of the MCS for each UE, the received signal power at each UE, the mobility of each UE in each of the plurality of UE groups. In some embodiments, dynamically creating at step 601 further includes determining an appropriateness of each of the plurality of valid UE groups based on a change in the appropriate codeword for each UE in each of the plurality of valid UE groups. Additionally, in some embodiments, dynamically creating at step 601 includes determining a number of UE's within the network coverage area, categorizing at least one of a MCS level, a power level of the base station, and a mobility state, determining at least one of the MCS for each UE, the received signal power at each UE, the mobility of each UE, and dynamically creating the plurality of UE groups based on a commonality of at least one of the MCS level, the power level of the base station, and the mobility state.

In some embodiments, determining the appropriate codeword at step 602 includes determining a plurality of available codewords from a codebook. Additionally, in some embodiments, determining the appropriate codeword at step 602 includes correlating, for each of the plurality of UE groups, a codeword for each UE with a codeword for each of the other UE's in a corresponding UE group. Further, in some embodiments, determining the appropriate codeword at step 602 is based on at least one of a received signal power for each of the plurality of UE groups, and a signal to interference noise ratio (SINR) of each of the plurality of UE groups.

Figure 7:
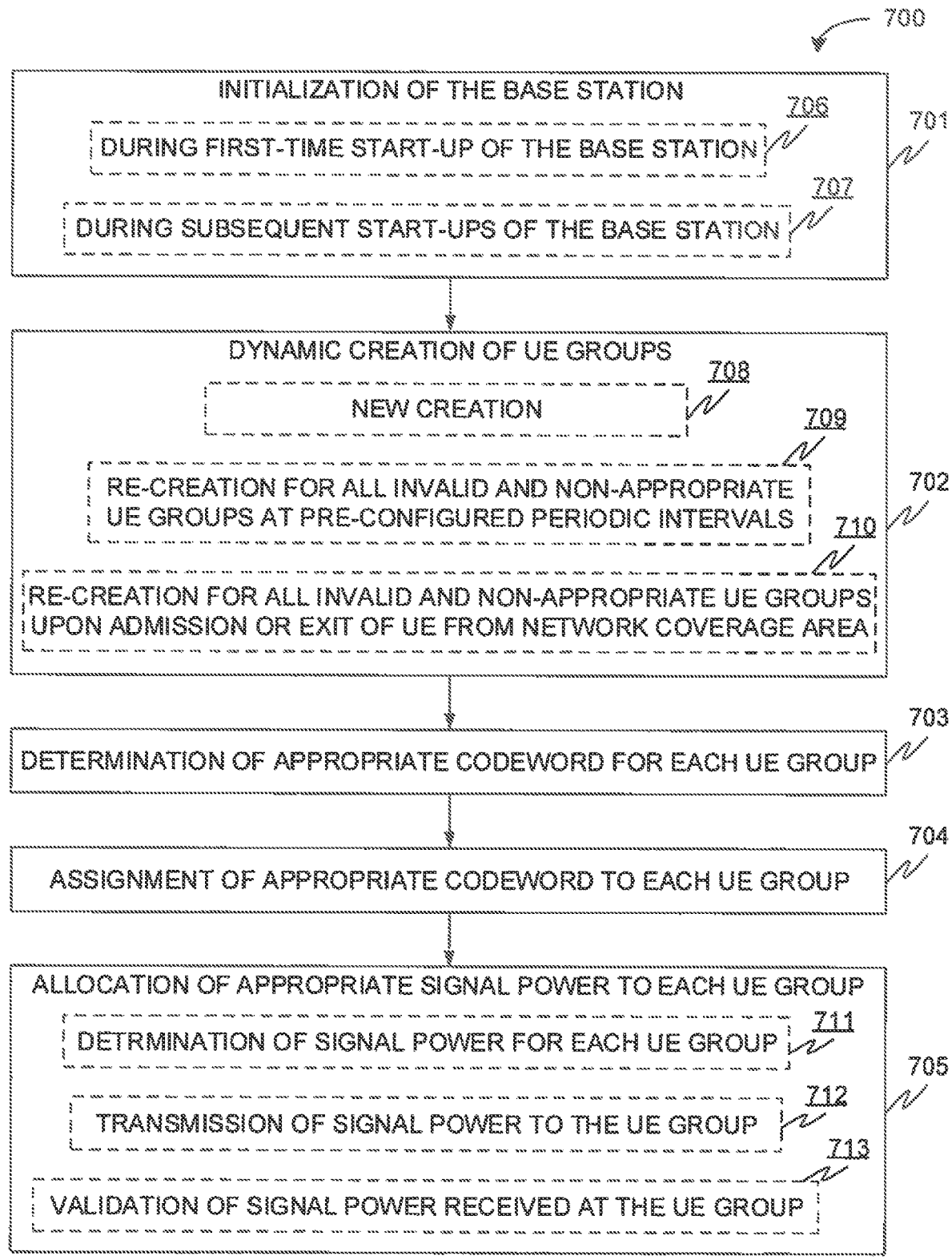
FIG. 7 is a flow diagram of a detailed exemplary process for providing an improved NOMA in a communication network, in accordance with some embodiments of the present disclosure.

Referring now to FIG. 7, exemplary control logic 700 for providing an improved NOMA in a communication network 100 is depicted in greater detail via a flowchart, in accordance with some embodiments of the present disclosure. As illustrated in the flowchart, the control logic 700 includes the steps of initializing the base station (BS) at step 701, dynamically creating UE groups at step 702, determining appropriate codeword for each groups at step 703, assigning appropriate codeword to each UE group at step 704, and allocating appropriate signal power to each UE group at step 705. Each of these steps will be described in greater detail herein below. It should be noted that the exemplary control logic 700 is described mainly with respect to improved eNB discussed above. However, as will be appreciated by those skilled in the art, the exemplary control logic 700 may be equally applicable to other BS's and will follow substantially similar logic with appropriate modifications and improvements.

In some embodiments, initializing the BS at step 701 includes initializing BS during first time start-up of the base station at step 706. For example, during the first time start-up of improved eNB, configuration component of IRRC performs start-up initialization. During initialization, configuration component of IRRC performs the steps that include, but are not limited to, receiving latest inputs of configuration parameters (e.g. from management application or MSS), configuring received parameters in the configuration component, and storing the received configuration parameters in local memory of the configuration component.

In some embodiments, initializing the base station at step 701 includes initializing the BS during subsequent start-up of the base station at step 707. For example, during subsequent start-ups of eNB, the configuration component of IRRC performs reconfiguration. The configuration component checks if there has been any change in IRRC configuration parameters. It checks if there is any new configuration parameter by checking the existing parameters. It also checks if any configuration parameter is modified by checking the parameter value. If there is change in configuration parameter(s), the configuration component of IRRC receives configuration information from management application through a communication interface (e.g., MSS-CSS interface). It then performs steps that include, but are not limited to, receiving latest inputs of configuration parameters from management application or MSS, configuring latest parameters in the configuration component, and storing the latest configuration parameters in local memory of the configuration component. However, if there is no change in configuration parameter(s), the configuration component of IRRC loads local configuration from store to own memory for configuring the configuration component.

In some embodiments, dynamically creating UE groups at step 702 includes creating new UE groups at step 708. As stated above, the UE groups may be created within a network coverage area of the BS based on at least one of a modulation coding scheme (MCS) for each UE, a received signal power at each UE, and a mobility of each UE. The creation of UE groups based on MCS includes the steps of determining a total number of UE's (UE(n)) within the network coverage area, categorizing the different MCS levels (MCS1, MCS2, MCS3, MCS4, ..., MCSn), determining the MCS of each of the UE's, and creating a group UEGRmcs based on a commonality of MCS levels. Similarly, the creation of UE groups based on signal power includes the steps of determining a total number of UE's (UE(n)) within the network coverage area, categorizing the different power levels of BS (PWR1, PWR2, PWR3, PWR4, ..., PWRn), determining the received power of each of the UE's, and creating a group UEGRpwr based on a commonality of threshold power levels. Further, creation of UE groups based on UE mobility includes the steps of determining a total number of UE's (UE(n)) within the network coverage area, categorizing the different mobility states (MS1, MS2, MS3, MS4, ..., MSn), determining the state of mobility of each of the UE's, and creating a group UEGRms based on a commonality of mobility state.

Further, a consolidated UE group may be determined based on a commonality of the mobility state, the signal power, and the MCS as depicted in equation (1):

$$UEGR_{cons} = UEGR_{ms} \cap UEGR_{pwr} \cap UEGR_{mcs}, \text{ where the symbol "}\cap\text{" refers to an intersection of the mentioned groups} \quad (1)$$

Additionally, a consolidated UE group is determined based on a commonality of at least two of the mobility state, the signal power, and the MCS as depicted in the equations (2) to (4):

$$UEGR_{cons\_(pwr,mcs)} = UEGR_{pwr} \cap UEGR_{mcs} - UEGR_{cons},$$
for commonality of received power and MCS  (2)

$$UEGR_{cons\_(ms,pwr)} = UEGR_{ms} \cap UEGR_{pwr} - UEGR_{cons},$$
for commonality of mobility state and received power  (3)

$$UEGR_{cons\_(ms,mcs)} = UEGR_{ms} \cap UEGR_{mcs} - UEGR_{cons},$$
for commonality of mobility state and MCS  (4)

In some embodiments, dynamically creating UE groups at step 702 includes re-creating UE groups for all invalid and non-appropriate UE groups at pre-configured periodic intervals at step 709. For example, upon expiry of pre-provisioned or pre-configured timer (Timer$_{UEGroup}$), the IRRC may checks the validity of each of the existing UE groups and may set the validity-flag as 'VALID' if the existing UE group is found to be valid. In instances, when the existing groups are found to be invalid, the IRRC sets the validity-flag as 'INVALID'. In an embodiment, the IRRC checks the validity of each of the existing UE groups based on the following steps:
  i) For an existing UE-group,
  ii) Check if MCS of any UE in the UE group has changed. If true consider that UE group as INVALID and go to step (v), else consider that UE group as VALID and go to step (iii);
  iii) Check if received signal of any UE in the UE group has changed. If true consider that UE group as INVALID and go to step (v), else consider that UE group as VALID and go to step (iv);
  iv) Check if mobility state of any UE in the UE group has changed. If true consider that UE group as INVALID and go to step (v), else consider that UE group as VALID and go to step (vi);
  v) Create an INVALID UEgroup (UEgroup$_{Invalid}$) and go to step (vi);
  vi) Repeat steps (i)-(v) until all existing UE groups has been considered (i.e., UE-group<number of UE-groups)

The NOMA component of the IRRC then checks appropriateness of the codeword allocation for each of the existing 'VALID' UE groups. The NOMA component further sets the appropriateness-flag as 'APPROPRIATE' for the corresponding VALID UE group in instances when the codeword allocation is found to be proper. The NOMA component sets the appropriateness-flag as 'NOT APPROPRIATE' for the corresponding VALID UE group in instances when the codeword allocation is not proper. It should be noted that, in some embodiments, the appropriateness-flag may not be a separate flag in itself but same as the validity-flag. Thus, in such embodiments, the NOMA component of the IRRC may set the validity-flag as 'VALID' if appropriateness of the codeword allocation for each of the existing 'VALID' UE groups is found appropriate or else sets the validity-flag as 'INVALID' if found inappropriate. In some embodiments, the NOMA component of IRRC checks the validity or appropriateness of each of the existing VALID UE groups based on the following steps:
  i) For an existing VALID UE-group,
  ii) Check if codeword of any UE in the UE group has changed. If true consider that UE group as NOT APPROPRIATE or INVALID and go to step (iii), else consider that UE group as APPROPRIATE or VALID and go to step (iv);
  iii) Create a NOT APPROPRIATE (UEgroup$_{NotAppropriate}$) or an INVALID UEgroup (UEgroup$_{Invalid}$) and go to step (vi);
  iv) Repeat steps (i)-(iii) until all existing VALID UEgroups has been considered (i.e., UE-group<number of VALID UE-groups)

The UE groups are then re-created for all the invalid and not-appropriate UE-groups. For example, in some embodiments, the NOMA component of IRRC receives the invalid UE groups (UEgroup$_{Invalid}$) and not-appropriate UE groups (UEgroup$_{NotAppropriate}$). The NOMA component of IRRC then performs re-creation of groups from the affected groups (i.e., UEgroup$_{Invalid}$ and UEgroup$_{NotAppropriate}$) via the process described at step 708 above.

In some embodiments, dynamically creating UE groups at step 702 includes re-creating UE groups for all invalid and non-appropriate UE groups upon admission or exit of any UE from the network coverage area at step 710. For example, the IRRC dynamically identifies any admission of new UE into the network coverage area and/or any exit of existing UE from the network coverage area via an UE-entry-exit-list. The IRRC then checks the validity of each of the existing UE groups via the process described at step 709 above. The IRRC sets the validity-flag as 'VALID' if the existing UE group is found valid. In case the existing UE group is not found to be valid, the IRRC else sets the validity-flag as 'INVALID'. The NOMA component of the IRRC then checks appropriateness of the codeword allocation for each of the existing 'VALID' UE groups via the process described at step 709 above. The NOMA component of the IRRC sets the appropriateness-flag as 'APPROPRIATE' for the corresponding VALID UE group if codeword allocation is found to proper or else sets the appropriateness-flag as 'NOT APPROPRIATE'. Again, it should be noted that, in some embodiments, the appropriateness-flag may not be a separate flag in itself but same as the validity-flag. Thus, in such embodiments, the NOMA component of the IRRC sets the validity-flag as 'VALID' if appropriateness of the codeword allocation for each of the existing 'VALID' UE groups is found appropriate or else sets the validity-flag as 'INVALID'.

The UE groups are then re-created or modified for all the invalid and not-appropriate UE-groups as well as for all the newly-admitted UE and/or exited UE form UE-entry-exitlist. For example, in some embodiments, the NOMA component of IRRC checks if any new UE is admitted in the coverage area of network. The NOMA component of IRRC then performs re-creation of groups for each newly-admitted UE via the process described at step 708 above. Similarly, the NOMA component of IRRC checks if any UE has exited from the coverage area of network. The NOMA component of IRRC then performs re-creation of groups for each exited UE via the process described at step 708 above. The process of UE group re-creation or modification is performed till all the UE's in the UE-entry-exit-list have been considered.

In some embodiments, determining appropriate codeword for each UE groups at step 703 includes determining appropriate codeword for all newly created UE groups as well as for all the re-created UE groups. In some embodiments, the determination of appropriate codeword for a UE Group ($UEGR_{ms}$, $UEGR_{pwr}$, and $UEGR_{mcs}$) may be performed by finding the available codewords from codebook, and determining an appropriate codeword for the UE Group. Further, in some embodiments, the determination of appropriate codeword for a UE Group ($UEGR_{cons}$, $UEGR_{cons\_(pwr, mcs)}$, $UEGR_{cons\_(ms, pwr)}$, and $UEGR_{cons\_(ms, mcs)}$) may be performed by correlating a codeword for each UE with a codeword for each of the other UE's in a corresponding UE group. For example, for each UE of $UEGR_{cons}$, codeword $CW_{cons}$ may be determined based on commonality. Such a determination may involve determining maximum codeword co-relation of each UE with the remaining UE in the group for commonality, in accordance with the equation (5):

$$CW_{cr\_cons} = \text{Max}(CW_{cons}, CW_{cons\_oth}) \quad (5)$$

The codeword $CW_{cons}$ to be used for each UE in the group $UEGR_{cons}$ is then determined based on the maximum co-relation $CW_{cr\_cons}$. Similarly, for each UE of $UEGR_{cons\_(pwr, mcs)}$, the codeword $CW_{pwr}$ may be determined based on received power. Such a determination may involve determining maximum codeword co-relation of each UE with the remaining UE in the group for power, in accordance with the equation (6):

$$CW_{cr\_pwr} = \text{Max}(CW_{pwr}, CW_{pwr\_oth}) \quad (6)$$

The codeword $CW_{pwr}$ to be used for each UE in the group $UEGR_{cons\_(pwr, mcs)}$ may be determined based on the maximum co-relation $CW_{cr\_pwr}$. Further, for each UE of $UEGR_{cons\_(ms, pwr)}$, the codeword $CW_{ms}$ may be determined based on mobility state. Such a determination may involve determining maximum codeword co-relation of each UE with the remaining UE in the group for mobility, in accordance with the equation (7):

$$CW_{cr\_ms} = \text{Max}(CW_{ms}, CW_{ms\_oth}) \quad (7)$$

The codeword $CW_{ms}$ to be used for each UE in the group $UEGR_{cons\_(ms, pwr)}$ may be determined based on the maximum co-relation $CW_{cr\_ms}$. Further, for each UE of $UEGR_{cons\_(ms, mcs)}$, the codeword $CW_{mcs}$ may be determined based on MCS. Such a determination may involve determining maximum codeword co-relation of each UE with the remaining UE in the group for MCS, in accordance with the equation (8):

$$CW_{cr\_mcs} = \text{Max}(CW_{mcs}, CW_{mcs\_oth}) \quad (8)$$

The codeword $CW_{mcs}$ to be used for each UE in the group $UEGR_{cons\_(ms, mcs)}$ may be determined based on the maximum co-relation $CW_{cr\_mcs}$. It should be noted that the maximum co-relation refers to minimum difference in codeword pattern.

In some embodiments, assigning the appropriate codeword to each UE group at step 704 includes assigning the codeword determined via the process described in step 703 to the corresponding UE groups. As will be appreciated, the determination and allocation of appropriate code is performed for all newly created UE groups or for all the re-created UE groups. For example, in some embodiments, the NOMA component of IRRC checks if the UE group created (newly created or re-created) is appropriate and if the codeword allocation is appropriate. If the UE group created is invalid or not appropriate, then the UE groups are re-created via the process described in step 702. Further, if the codeword allocation is inappropriate then the NOMA component performs codeword re-assignment (i.e., determination and allocation of appropriate codeword) via the process described at steps 703 and 704 above. The process iteratively continues during the operation cycle of the base station. Further, as noted above, the process iterates at a pre-configured periodic interval, upon admission of a new UE into the network coverage area, or upon exit of an existing UE from the network coverage area.

In some embodiments, allocating appropriate signal power to each UE group at step 705 includes determining signal power for each UE groups at step 711. As will be appreciated, the determination is made by the NOMA component of IRRC based on the appropriate codeword after successfully creating UE Groups and assigning appropriate keywords for each UE group. For example, for each UE in $UEGR_{cons}$, the signal power $SigPow_{cons}$ is determined based on codeword $CW_{cons}$. Similarly, for each UE in $UEGR_{cons\_(pwr, mcs)}$, the signal power $SigPow_{pwr}$ is determined based on codeword $CW_{pwr}$. Further, for each UE in $UEGR_{cons\_(ms, pwr)}$, the signal power $SigPow_{ms}$ is determined based on codeword $CW_{ms}$. Further, for each UE in $UEGR_{cons\_(ms, mcs)}$, the signal power $SigPow_{mcs}$ may be determined based on codeword $CW_{mcs}$.

In some embodiments, allocating appropriate signal power to each UE group at step 705 further includes transmitting the determined signal power to each UE in the UE group for allocation at step 712. In some embodiments, after determination of signal power (for commonality, MCS, power, and mobility) at step 711, the NOMA component of IRRC sends the information to PHY subsystem for power transmission.

In some embodiments, allocating appropriate signal power to each UE group at step 705 further includes validating signal power received at each UE within the UE group at step 713. Thus, after transmission of the power signal for each UE in the UE group, validation is performed to check whether the signal power is correctly determined by appropriate codeword assignment. In some embodiments, after allocation the signal power by PHY subsystem, the NOMA component of IRRC checks the received power (PowRec) by UE by feedback mechanism using channel state information. For example, the NOMA component determines deviation in signal power for commonality ($SigPow_{Dev\_cons}$), MCS ($SigPow_{Dev\_mcs}$), received power ($SigPow_{Dev\_pwr}$), and mobility ($SigPow_{Dev\_mob}$) based on the equations (9) to (12):

$$SigPow_{Dev\_cons} = |PowRec - SigPow_{cons}| \quad (9)$$

$$SigPow_{Dev\_mcs} = |PowRec - SigPow_{mcs}| \quad (10)$$

$$SigPow_{Dev\_pwr} = |PowRec - SigPow_{pwr}| \quad (11)$$

$$SigPow_{Dev\_mob} = |PowRec - SigPow_{mob}| \quad (12)$$

where the operator "||" refers to the mathematical modulus operator.

In instances, when the $\text{SigPow}_{Dev\_cons}$, $\text{SigPow}_{Dev\_mcs}$, $\text{SigPow}_{Dev\_pwr}$, or $\text{SigPow}_{Dev\_mob}$ is greater than the pre-configured or pre-provisioned threshold RSRP ($\text{RSRP}_{th}$), then the process goes back to step 703 for determination of appropriate codeword such that the allocated signal power is appropriate.

Thus, the techniques described in the embodiments discussed above provide for appropriate codeword determination for supporting larger number of UE's in the coverage area of BS. As discussed in step 702, this may be enabled by periodic segregation of UE's to from UE groups based on mobility (speed and location) of UE's in network coverage in case of UE's under movement, received signal strength at UE's from BS, and modulation coding scheme (MCS) for each UE. Further, as discussed in steps 703 and 704, this may be enabled by allocation of appropriate codeword to different UE groups to be used by all UE's in a group. Allocation of appropriate codeword to UE group provides accommodation for more numbers of UE's for same available set of codewords as there can be multiple UE's in groups using same codeword (codeword reuse within a group). This will enable support to large number of UE's within the network coverage area. As discussed above, the allocation of appropriate codeword is based on received signal strength (RSRP) for the UE group, and signal to interference noise ratio (SINR) of the UE group.

Further, the techniques described in the embodiments discussed above provide for appropriate signal power allocation supporting multiple MCS simultaneously. As discussed in step 705, this may be enabled by optimal signal power transmission by BS based on appropriate codeword assignment to UE group by taking into consideration RSRP and multiple MCS simultaneously. Further, as discussed in steps 703, 704, and 705, the techniques described in the embodiments discussed above minimizes SINR among UE's in the proximity. This is enabled by taking into account SINR while determining appropriate codeword as well as by allocating signal power based on the appropriate codeword.

As will be also appreciated, the above described techniques may take the form of computer or controller implemented processes and apparatuses for practicing those processes. The disclosure can also be embodied in the form of computer program code containing instructions embodied in tangible media, such as floppy diskettes, CD-ROMs, hard drives, or any other computer-readable storage medium, wherein, when the computer program code is loaded into and executed by a computer or controller, the computer becomes an apparatus for practicing the invention. The disclosure may also be embodied in the form of computer program code or signal, for example, whether stored in a storage medium, loaded into and/or executed by a computer or controller, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

Figure 8:
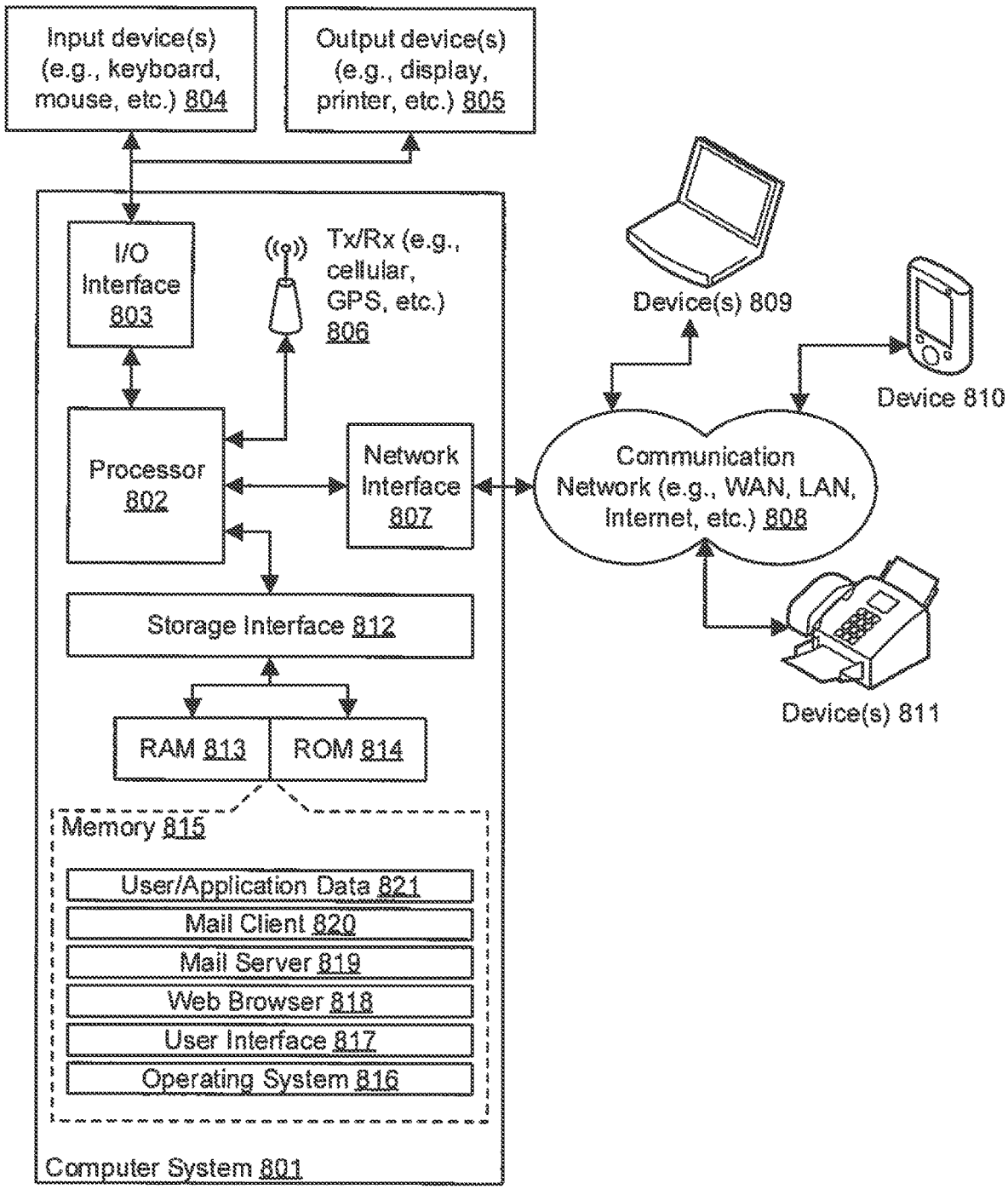
FIG. 8 is a block diagram of an exemplary computer system for implementing embodiments consistent with the present disclosure.

The disclosed methods and systems may be implemented on a conventional or a general-purpose computer system, such as a personal computer (PC) or server computer. Referring now to FIG. 8, a block diagram of an exemplary computer system 801 for implementing embodiments consistent with the present disclosure is illustrated. Variations of computer system 801 may be used for implementing components of communication network 100, the eNB 200, and various components of eNB 300, 400, 500 for providing improved NOMA in the communication network. Computer system 801 may include a central processing unit ("CPU" or "processor") 802. Processor 802 may include at least one data processor for executing program components for executing user- or system-generated requests. A user may include a person, a person using a device such as such as those included in this disclosure, or such a device itself. The processor may include specialized processing units such as integrated system (bus) controllers, memory management control units, floating point units, graphics processing units, digital signal processing units, etc. The processor may include a microprocessor, such as AMD Athlon, Duron or Opteron, ARM's application, embedded or secure processors, IBM PowerPC, Intel's Core, Itanium, Xeon, Celeron or other line of processors, etc. The processor 802 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 802 may be disposed in communication with one or more input/output (I/O) devices via I/O interface 803. The I/O interface 803 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 803, the computer system 801 may communicate with one or more I/O devices. For example, the input device 804 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, gyroscope, proximity sensor, or the like), stylus, scanner, storage device, transceiver, video device/source, visors, etc. Output device 805 may be a printer, fax machine, video display (e.g., cathode ray tube (CRT), liquid crystal display (LCD), light-emitting diode (LED), plasma, or the like), audio speaker, etc. In some embodiments, a transceiver 806 may be disposed in connection with the processor 802. The transceiver may facilitate various types of wireless transmission or reception. For example, the transceiver may include an antenna operatively connected to a transceiver chip (e.g., Texas Instruments WiLink WL1283, Broadcom BCM4750IUB8, Infineon Technologies X-Gold 618-PMB9800, or the like), providing IEEE 802.11a/b/g/n, Bluetooth, FM, global positioning system (GPS), 2G/3G HSDPA/HSUPA communications, etc.

In some embodiments, the processor 802 may be disposed in communication with a communication network 808 via a network interface 807. The network interface 807 may communicate with the communication network 808. The network interface may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 808 may include, without limitation, a direct interconnection, local area network (LAN), wide area network (WAN), wireless network (e.g., using Wireless Application Protocol), the Internet, etc. Using the network interface 807 and the communication network 808, the computer system 801 may communicate with devices 809, 810, and 811. These devices may include, without limitation, personal computer(s), server(s), fax machines, printers, scanners, various mobile devices such as cellular telephones, smartphones (e.g., Apple iPhone, Blackberry, Android-based phones, etc.), tablet computers, eBook readers (Amazon Kindle, Nook, etc.), laptop computers, notebooks, gaming consoles (Microsoft Xbox, Nintendo DS, Sony PlayStation, etc.), or the like. In some embodiments, the computer system 801 may itself embody one or more of these devices.

In some embodiments, the processor 802 may be disposed in communication with one or more memory devices (e.g., RAM 813, ROM 814, etc.) via a storage interface 812. The storage interface may connect to memory devices including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc.

The memory devices may store a collection of program or database components, including, without limitation, an operating system 816, user interface application 817, web browser 818, mail server 819, mail client 820, user/application data 821 (e.g., any data variables or data records discussed in this disclosure), etc. The operating system 816 may facilitate resource management and operation of the computer system 801. Examples of operating systems include, without limitation, Apple Macintosh OS X, Unix, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), IBM OS/2, Microsoft Windows (XP, Vista/7/8, etc.), Apple iOS, Google Android, Blackberry OS, or the like. User interface 817 may facilitate display, execution, interaction, manipulation, or operation of program components through textual or graphical facilities. For example, user interfaces may provide computer interaction interface elements on a display system operatively connected to the computer system 801, such as cursors, icons, check boxes, menus, scrollers, windows, widgets, etc. Graphical user interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, Javascript, AJAX, HTML, Adobe Flash, etc.), or the like.

In some embodiments, the computer system 801 may implement a web browser 818 stored program component. The web browser may be a hypertext viewing application, such as Microsoft Internet Explorer, Google Chrome, Mozilla Firefox, Apple Safari, etc. Secure web browsing may be provided using HTTPS (secure hypertext transport protocol), secure sockets layer (SSL), Transport Layer Security (TLS), etc. Web browsers may utilize facilities such as AJAX, DHTML, Adobe Flash, JavaScript, Java, application programming interfaces (APIs), etc. In some embodiments, the computer system 801 may implement a mail server 819 stored program component. The mail server may be an Internet mail server such as Microsoft Exchange, or the like.

The mail server may utilize facilities such as ASP, ActiveX, ANSI C++/C#, Microsoft .NET, CGI scripts, Java, JavaScript, PERL, PHP, Python, WebObjects, etc. The mail server may utilize communication protocols such as internet message access protocol (IMAP), messaging application programming interface (MAPI), Microsoft Exchange, post office protocol (POP), simple mail transfer protocol (SMTP), or the like. In some embodiments, the computer system 801 may implement a mail client 820 stored program component. The mail client may be a mail viewing application, such as Apple Mail, Microsoft Entourage, Microsoft Outlook, Mozilla Thunderbird, etc.

In some embodiments, computer system 801 may store user/application data 821, such as the data, variables, records, etc. (e.g., user data, control data, configuration data, UE group timer, RSRP threshold, UE-entry-exit list, and so forth) as described in this disclosure. Such databases may be implemented as fault-tolerant, relational, scalable, secure databases such as Oracle or Sybase. Alternatively, such databases may be implemented using standardized data structures, such as an array, hash, linked list, struct, structured text file (e.g., XML), table, or as object-oriented databases (e.g., using ObjectStore, Poet, Zope, etc.). Such databases may be consolidated or distributed, sometimes among the various computer systems discussed above in this disclosure. It is to be understood that the structure and operation of the any computer or database component may be combined, consolidated, or distributed in any working combination.

As will be appreciated by those skilled in the art, the techniques, described in the various embodiments discussed above, provide for improved NOMA with appropriate codeword assignment for supporting large number of UE's in the coverage area while optimizing signal power transmission in a wireless communication network. The techniques maximize support to number of UE's in the coverage area by optimizing use/reuse of codeword for a group of UE's within network coverage area. In other words, the techniques provide mechanism for codeword determination, reuse, and assignment of appropriate codeword to the UE groups comprising of multiple UE's, thereby supporting larger number of UE's in the coverage area (exceeding the limited number of codewords).

The techniques further facilitate mobility of large number of UE's within coverage area, and base station power control through selective signal multiplexing. The techniques enable optimal power use by BS by signal power management for different UE's so as to achieve optimal service level for all UE's in the coverage area. The techniques further provide for accurate signal power transmission supporting multiple MCS simultaneously, in a wireless communication network while minimizing SINR among UE's in the proximity. The transmission of signal by BS is based on appropriate assignment of UE codeword leading to effective cell-average and cell-edge throughput for each UE in a multi-antenna scenario.

As will be appreciated by those skilled in the art, the techniques, described in the various embodiments discussed above, may find application in at least 5G wireless communication, successive interference cancellation, and power domain signal multiplexing among other applications.

The specification has described system and method for providing an improved NOMA in a communication network. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method for providing an improved Non-Orthogonal Multiple Access (NOMA) in a wireless communication network, the method comprising:
    dynamically creating, by a base station (BS), a plurality of user equipment (UE) groups within a network coverage area based on a reference signal received power (RSRP) at each UE and at least one of a modulation coding scheme (MCS) for each UE and a mobility of each UE, wherein each of the plurality of UE groups comprises a plurality of UE's, and wherein the BS receives the RSRP at a given UE from the given UE;
    determining, by the BS, an appropriate codeword for each of the plurality of UE groups, wherein determining the appropriate codeword for a given UE group comprises determining a co-relation of a codeword for each UE in the given UE group with a codeword for each of the other UE's in the given UE group based on a commonality for the RSRP at each UE in the given UE group and at least one of the MCS for each UE in the given UE group and the mobility state of each UE in the given UE group; and
    assigning, by the BS, the appropriate codeword to each of the plurality of UE groups.

2. The method of claim 1, further comprising initializing the BS with a plurality of configuration parameters.

3. The method of claim 1, wherein the plurality of UE groups are dynamically created at a pre-configured periodic interval.

4. The method of claim 1, wherein the plurality of UE groups are dynamically created upon admission of a new UE into the network coverage area or upon exit of an existing UE from the network coverage area.

5. The method of claim 1, wherein dynamically creating the plurality of UE groups comprises determining a validity of each of the plurality of UE groups based on a change in at least one of the MCS for each UE, the RSRP at each UE, and the mobility of each UE in each of the plurality of UE groups.

6. The method of claim 5, further comprising determining an appropriateness of each of the plurality of valid UE groups based on a change in the appropriate codeword for each UE in each of the plurality of valid UE groups.

7. The method of claim 1, wherein dynamically creating the plurality of UE groups comprises:
    determining a number of UE's within the network coverage area;
    categorizing at least one of a MCS level, a power level of the base station, and a mobility state;
    determining at least one of the MCS for each UE, the RSRP at each UE, the mobility of each UE; and
    dynamically creating the plurality of UE groups based on a commonality of at least one of the MCS level, the power level of the base station, and the mobility state.

8. The method of claim 1, wherein determining the appropriate codeword comprises determining a plurality of available codewords from a codebook.

9. The method of claim 1, wherein determining the correlation comprises determining a maximum co-relation of a codeword for each UE in the given UE group with a codeword for each of the other UE's in the given UE group, and wherein the maximum co-relation corresponds to a minimum difference in codeword patterns.

10. The method of claim 1, wherein determining and assigning the appropriate codeword is further based on a signal to interference noise ratio (SINR) of each of the UE in the given UE group.

11. The method of claim 1, further comprising:
    determining a signal power for each of the plurality of UE groups based on the corresponding appropriate codeword; and
    allocating the signal power to each of the plurality of UE groups, and wherein allocating the signal power to a given UE group comprises:
        transmitting the signal power to each UE within the given UE group; and
        validating a signal power received at each UE within the given UE group based on a preconfigured threshold RSRP.

12. The method of claim 11, wherein validating the signal power comprises:
    determining a deviation of the signal power received at each UE within the given UE group from the signal power determined for the given UE group; and
    comparing the deviation against the pre-configured threshold RSRP.

13. A device comprising:
    at least one processor; and
    a memory for storing instructions that, when executed by the at least one processor, cause the at least one processor to perform operations comprising:
        dynamically creating a plurality of user equipment (UE) groups within a network coverage area based on a reference signal received power (RSRP) at each UE and at least one of a modulation coding scheme (MCS) for each UE and a mobility of each UE, wherein each of the plurality of UE groups comprises a plurality of UE's, and wherein the BS receives the RSRP at a given UE from the given UE;
        determining an appropriate codeword for each of the plurality of UE groups, wherein determining the appropriate codeword for a given UE group comprises determining a co-relation of a codeword for each UE in the given UE group with a codeword for each of the other UE's in the given UE group based on a commonality for the RSRP at each UE in the given UE group and at least one of the MCS for each UE in the given UE group and the mobility state of each UE in the given UE group; and assigning the appropriate codeword to each of the plurality of UE groups.

14. The device of claim 13, wherein the plurality of UE groups are dynamically created at a pre-configured periodic interval, or upon admission of a new UE into the network coverage area, or upon exit of an existing UE from the network coverage area.

15. The device of claim 13, wherein dynamically creating the plurality of UE groups comprises:
determining a validity of each of the plurality of UE groups based on a change in at least one of the MCS for each UE, the RSRP at each UE, and the mobility of each UE in each of the plurality of UE groups; and
determining an appropriateness of each of the plurality of valid UE groups based on a change in the appropriate codeword for each UE in each of the plurality of valid UE groups.

16. The device of claim 13, wherein dynamically creating the plurality of UE groups comprises:
determining a number of UE's within the network coverage area;
categorizing at least one of a MCS level, a power level of the base station, and a mobility state;
determining at least one of the MCS for each UE, the RSRP at each UE, the mobility of each UE; and
dynamically creating the plurality of UE groups based on a commonality of at least one of the MCS level, the power level of the base station, and the mobility state.

17. The device of claim 13, wherein determining the appropriate codeword comprises:
determining a plurality of available codewords from a codebook.

18. The device of claim 13, wherein determining and assigning the appropriate codeword is further based on a signal to interference noise ratio (SINR) of each of UE in the given UE group.

19. The device of claim 13, wherein one or more operations further comprise:
determining a signal power for each of the plurality of UE groups based on the corresponding appropriate codeword; and
allocating the signal power to each of the plurality of UE groups, wherein allocating the signal power to a given UE group comprises:
transmitting the signal power to each UE within the given UE group; and
validating a signal power received at each UE within the given UE group based on a preconfigured threshold RSRP, wherein validating comprises:
determining a deviation of the signal power received at each UE within the given UE group from the signal power determined for the given UE group; and
comparing the deviation against the pre-configured threshold RSRP.

20. A non-transitory computer-readable medium storing instructions for providing an improved Non-Orthogonal Multiple Access (NOMA) in a wireless communication network, wherein upon execution of the instructions by one or more processors, the one or more processors perform operations comprising:
dynamically creating a plurality of user equipment (UE) groups within a network coverage area based on a reference signal received power (RSRP) at each UE and at least one of a modulation coding scheme (MCS) for each UE and a mobility of each UE, wherein each of the plurality of UE groups comprises a plurality of UE's, and wherein the BS receives the RSRP at a given UE from the given UE;
determining an appropriate codeword for each of the plurality of UE groups, wherein determining the appropriate codeword for a given UE group comprises determining a co-relation of a codeword for each UE in the given UE group with a codeword for each of the other UE's in the given UE group based on a commonality for the RSRP at each UE in the given UE group and at least one of the MCS for each UE in the given UE group and the mobility state of each UE in the given UE group; and
assigning the appropriate codeword to each of the plurality of UE groups.

21. A method for providing an improved Non-Orthogonal Multiple Access (NOMA) in a wireless communication network, the method comprising:
dynamically creating, by a base station (BS), a plurality of user equipment (UE) groups within a network coverage area based on a reference signal received power (RSRP) at each UE, wherein each of the plurality of UE groups comprises a plurality of UE's, and wherein the BS receives the RSRP at a given UE from the given UE;
determining, by the BS, an appropriate codeword for each of the plurality of UE groups, wherein determining the appropriate codeword for a given UE group comprises determining a co-relation of a codeword for each UE in the given UE group with a codeword for each of the other UE's in the given UE group based on a commonality for at least one of the RSRP at each UE in the given UE group, a modulation coding scheme (MCS) for each UE in the given UE group, and a mobility state of each UE in the given UE group, and wherein the BS determines the MCS for a given UE and the mobility stated of the given UE based on inputs received from the given UE; and
assigning, by the BS, the appropriate codeword to each of the plurality of UE groups, wherein assigning a given appropriate codeword to a given UE group comprises assigning the given appropriate codeword to each of the plurality of UE's in the given UE group.

* * * * *